(12) United States Patent
Kiesel et al.

(10) Patent No.: US 9,631,452 B2
(45) Date of Patent: Apr. 25, 2017

(54) MULTI-PIECE MOLDED COMPOSITE MANDREL AND METHODS OF MANUFACTURING

(71) Applicant: QUANTUM COMPOSITES, INC., Bay City, MI (US)

(72) Inventors: Michael Dale Kiesel, Bay City, MI (US); Matthew Louis Kaczmarczyk, Bay City, MI (US); Roy B. Bendickson, Ashtabula, OH (US); Justin John McClure, Bay City, MI (US)

(73) Assignee: QUANTUM COMPOSITES, INC., Bay City, MI (US)

( * ) Notice: Subject to any disclaimer, the term of this patent is extended or adjusted under 35 U.S.C. 154(b) by 441 days.

(21) Appl. No.: 14/247,111

(22) Filed: Apr. 7, 2014

(65) Prior Publication Data
US 2015/0285022 A1    Oct. 8, 2015

(51) Int. Cl.
| | |
|---|---|
| *E21B 33/12* | (2006.01) |
| *E21B 33/134* | (2006.01) |
| *B29C 65/00* | (2006.01) |
| *B29C 69/00* | (2006.01) |
| B29C 43/36 | (2006.01) |
| B29K 105/12 | (2006.01) |

(52) U.S. Cl.
CPC ........ *E21B 33/1204* (2013.01); *B29C 65/002* (2013.01); *B29C 69/00* (2013.01); *E21B 33/134* (2013.01); *B29C 2043/3628* (2013.01); *B29K 2105/12* (2013.01)

(58) Field of Classification Search
CPC ..... E21B 33/1204; E21B 33/12; B29C 66/71; B29C 70/54; B29C 65/002; B29C 69/00; B29C 2043/3628; B29K 2105/12

USPC ..... 138/156, 157, 158, 159, 170; 166/242.7, 166/179
See application file for complete search history.

(56) References Cited

U.S. PATENT DOCUMENTS

| | | |
|---|---|---|
| 3,419,468 A | 12/1968 | Smith |
| 4,708,202 A | 11/1987 | Sukup et al. |
| 5,095,980 A | 3/1992 | Watson |
| 5,259,901 A | 11/1993 | Davis et al. |
| 5,263,351 A | 11/1993 | Berg, III |
| 5,316,611 A | 5/1994 | Moser |
| 5,540,279 A | 7/1996 | Branch et al. |
| 5,580,416 A | 12/1996 | Lin et al. |
| 5,667,228 A | 9/1997 | Fabris |
| 6,027,325 A | 2/2000 | Piotrowski |
| 6,695,050 B2 | 2/2004 | Winslow et al. |
| 6,708,770 B2 | 3/2004 | Slup et al. |

(Continued)

OTHER PUBLICATIONS

Industrial Quick Search (IQS) Manufacturer Directory—Conveyor Belts Press Releases—"New Split Spools for Line-Shaft Conveyors", from http://www.conveyorbelting.net/Press-Releases.htm, dated Aug. 5, 2008.

*Primary Examiner* — Michael Wills, III
(74) *Attorney, Agent, or Firm* — Ladas & Parry LLP

(57) ABSTRACT

A mandrel for downhole isolation tools includes multiple composite pieces assembled about a common longitudinal axis at one or more common joint surfaces to form said mandrel, wherein each of said composite pieces is configured having a cross-sectional area less than the cross-sectional area of said mandrel, and an attachment mechanism configured to secure together said common joint surfaces.

17 Claims, 9 Drawing Sheets

(56) References Cited

U.S. PATENT DOCUMENTS

| | | |
|---|---|---|
| 6,712,153 B2 | 3/2004 | Turley et al. |
| 7,124,831 B2 | 10/2006 | Turley et al. |
| 7,735,549 B1 | 6/2010 | Nish et al. |
| 8,101,035 B2 | 1/2012 | Stenard |
| 8,398,801 B2 | 3/2013 | Barlow et al. |
| 2003/0164565 A1 | 9/2003 | O'Brien |
| 2010/0288488 A1 | 11/2010 | Turley et al. |
| 2011/0259610 A1 | 10/2011 | Shkurti et al. |
| 2013/0146167 A1 | 6/2013 | Barlow et al. |
| 2013/0327517 A1 | 12/2013 | Good, III et al. |

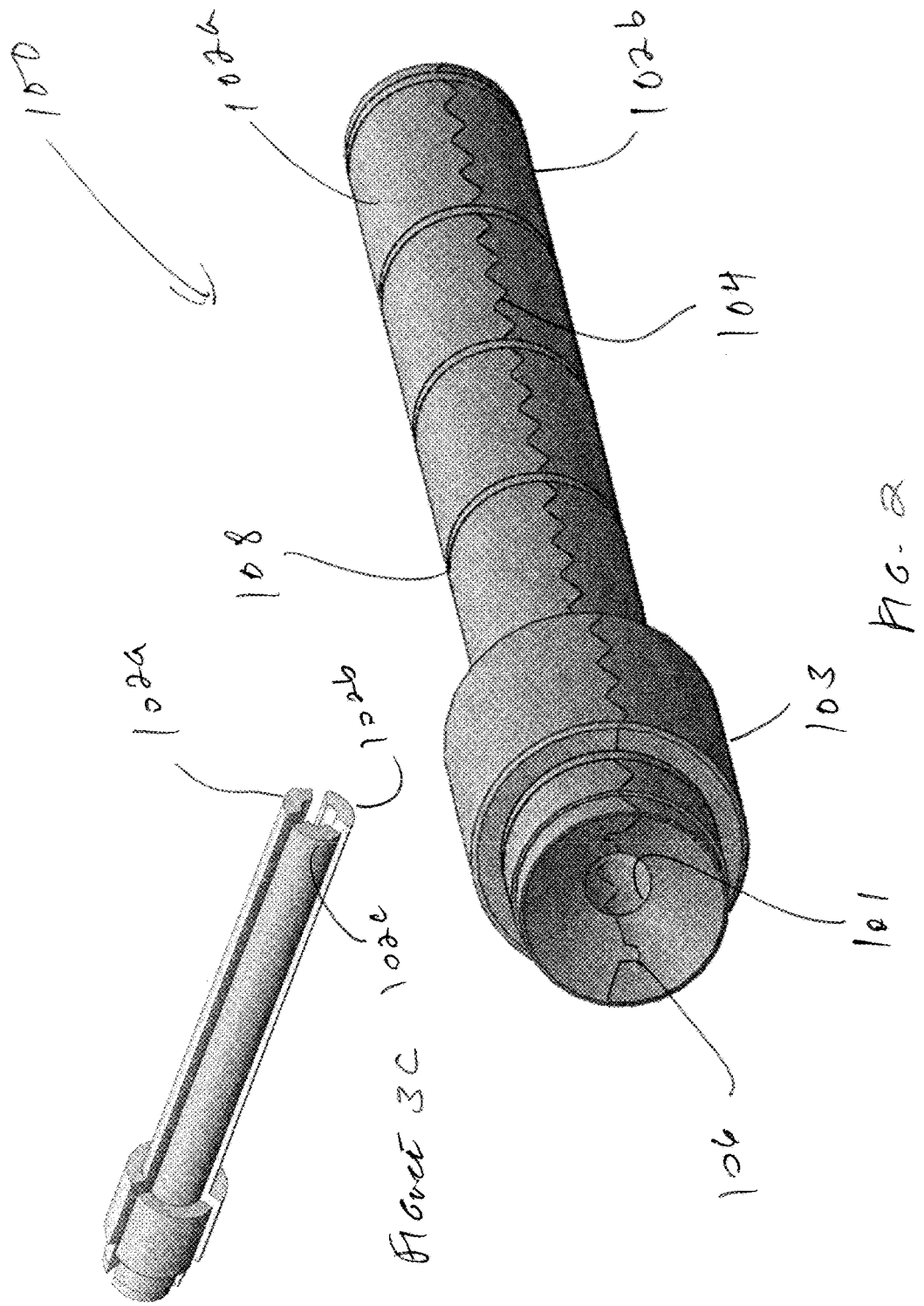

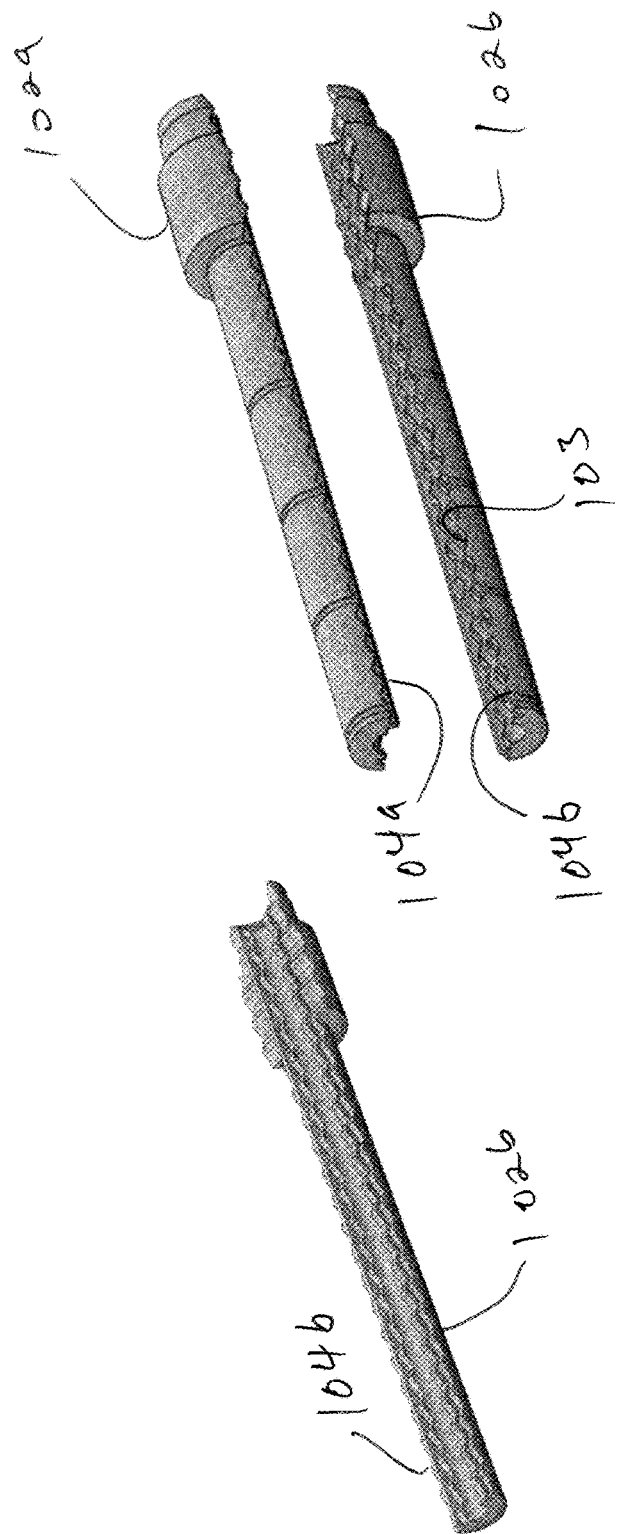

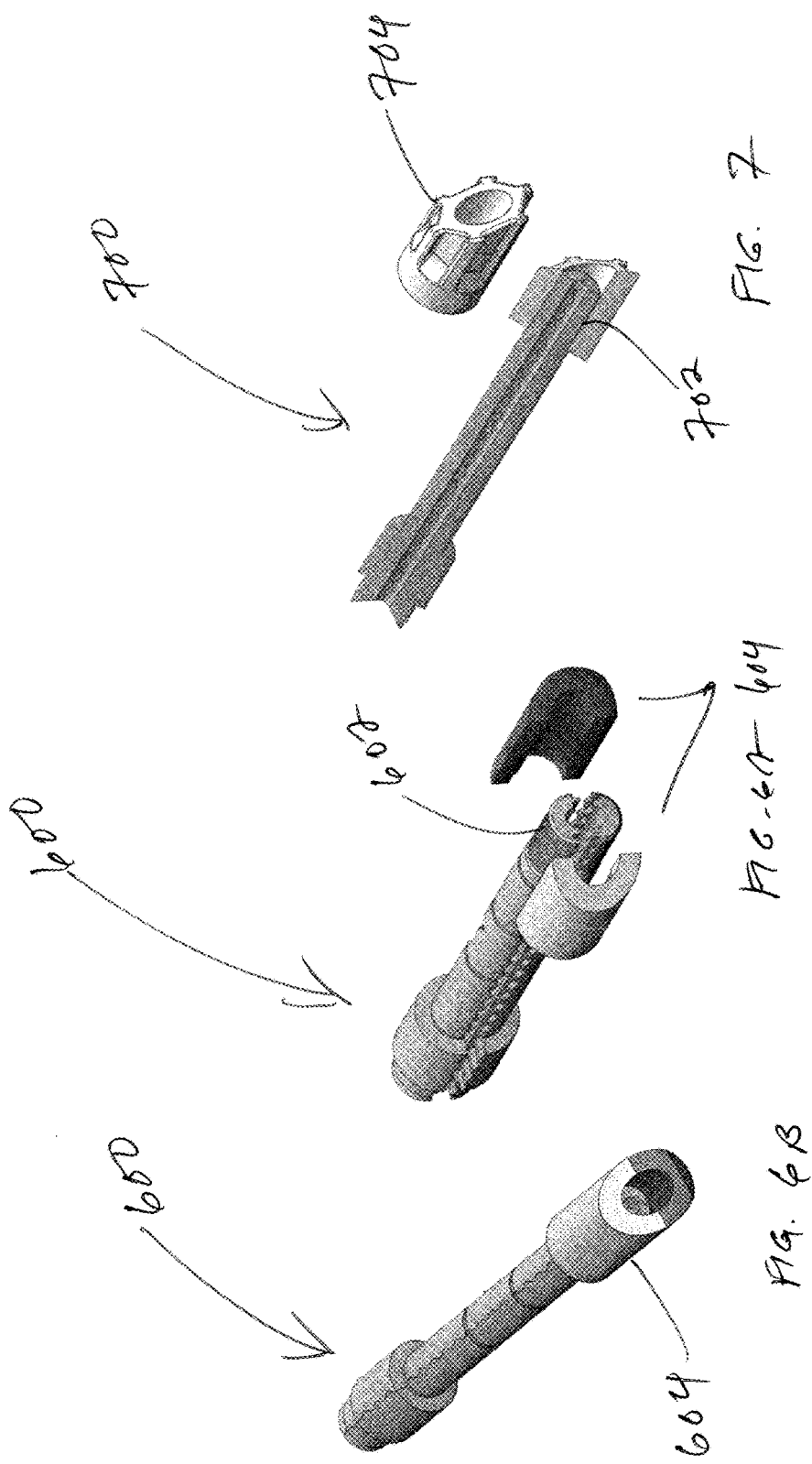

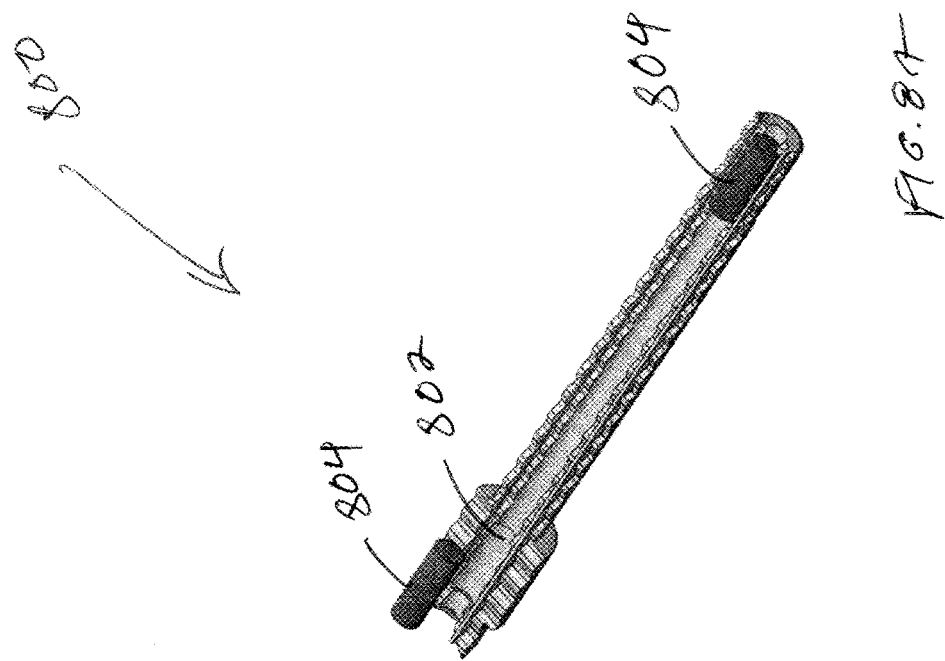
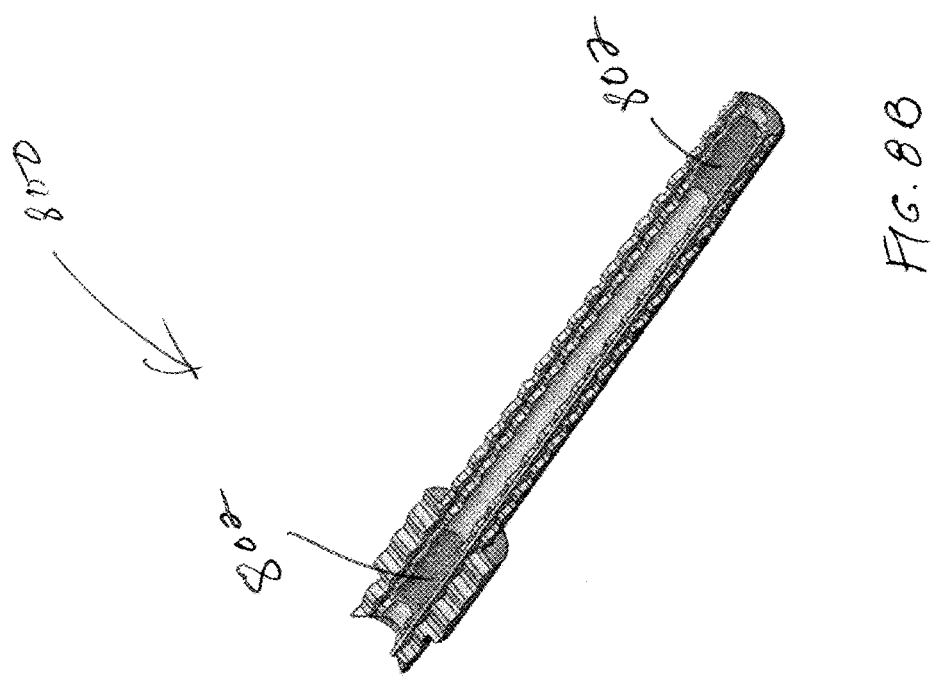

MULTI-PIECE MOLDED COMPOSITE MANDREL AND METHODS OF MANUFACTURING

FIELD

Embodiments disclosed herein relate to multi-piece composite mandrels, and methods of manufacturing multi-piece composite mandrels used in downhole isolation tools.

BACKGROUND

Downhole isolation tools located and set to isolate a zone of well casing in the wellbore during stimulation or other service work include bridge plugs and frac plugs. Shown in FIG. 1, the isolation tool 1 includes an internal elongated mandrel 2 and a circular array of slips 4 mounted on the mandrel 2 at each end of the tool 1. Each slip 4 has an outer surface configured to engage an internal surface of the well casing. Each array of slips 4 is disposed next to a respective conical ring 6 mounted on the mandrel 2 for sliding under the inclined inner surfaces of the slips 4 in the array. In the middle of the isolation tool 1 is an elastomeric seal 8 between the conical rings 6. When a setting tool (not shown) pulls the mandrel 2 in the longitudinal direction, the seal 8 expands outward in the radial direction to seal the well casing. In addition, the conical rings 6 slide under the slips 4 and force the slips 4 outward in the radial direction into engagement with the well casing. The slips 4 lock the isolation tool 1 in place inside the well casing in such a way that the seal 8 remains compressed for sealing the well casing when the setting tool is removed.

Oftentimes it is most economical to manufacture the isolation tool to become permanently set in the well casing so that it must be drilled out destructively to unseal the well casing. Therefore, a number of downhole tool makers have replaced cast iron components of the isolation tool with composite components. Composite components can be drilled out faster than cast iron, and the drilled-out chips of composite material are lighter than cast iron so that the composite chips are more easily flushed out of the tubular member with drilling fluid. Historically, composite mandrels for bridge and frac plugs have been fabricated using manufacturing methods that are designed to form one-piece tubes, such as roll wrapping, filament winding, and pultrusion. However, compression molding a tube has drawbacks in that undesired flow lines are created causing low strength areas. What is needed then is a method of manufacturing a composite mandrel for bridge and frac plugs that alleviates problems of the prior art.

SUMMARY

In one aspect, embodiments disclosed herein relate to a mandrel for downhole isolation tools including multiple composite pieces assembled about a common longitudinal axis at one or more common joint surfaces to form said mandrel, wherein each of said composite pieces is configured having a cross-sectional area less than the cross-sectional area of said mandrel, and an attachment mechanism configured to secure together said common joint surfaces.

In other aspects, embodiments disclosed herein relate to a downhole tool for isolating a well casing zone in a wellbore, the tool including a mandrel comprising multiple composite pieces assembled about a common longitudinal axis at one or more common joint surfaces to form said mandrel, wherein each of said composite pieces is configured having a cross-sectional area less than the cross-sectional area of said mandrel, and an attachment mechanism to secure together said joint surfaces. The tool further includes a circular array of slips mounted on the mandrel at each end of the tool, wherein each slip has an outer surface configured to engage an internal surface of the well casing, a conical ring mounted on the mandrel next to each array of said slips, wherein said conical ring is configured to slide under said slips and force the slips outward in the radial direction into engagement with the well casing, and an elastomeric seal between said conical rings configured to expand outward in the radial direction to seal the well casing.

In yet other aspects, embodiments disclosed herein relate to a method of manufacturing a mandrel for downhole isolation tools, the method including molding composite pieces having a cross-sectional area less than the cross-sectional area of said mandrel, assembling multiple composite pieces about a common longitudinal axis, and engaging one or more common joint surfaces for restricting longitudinal movement between adjacent composite pieces.

BRIEF DESCRIPTION OF THE DRAWINGS

The invention is illustrated in the accompanying drawings wherein.

DETAILED DESCRIPTION

Figure 1:
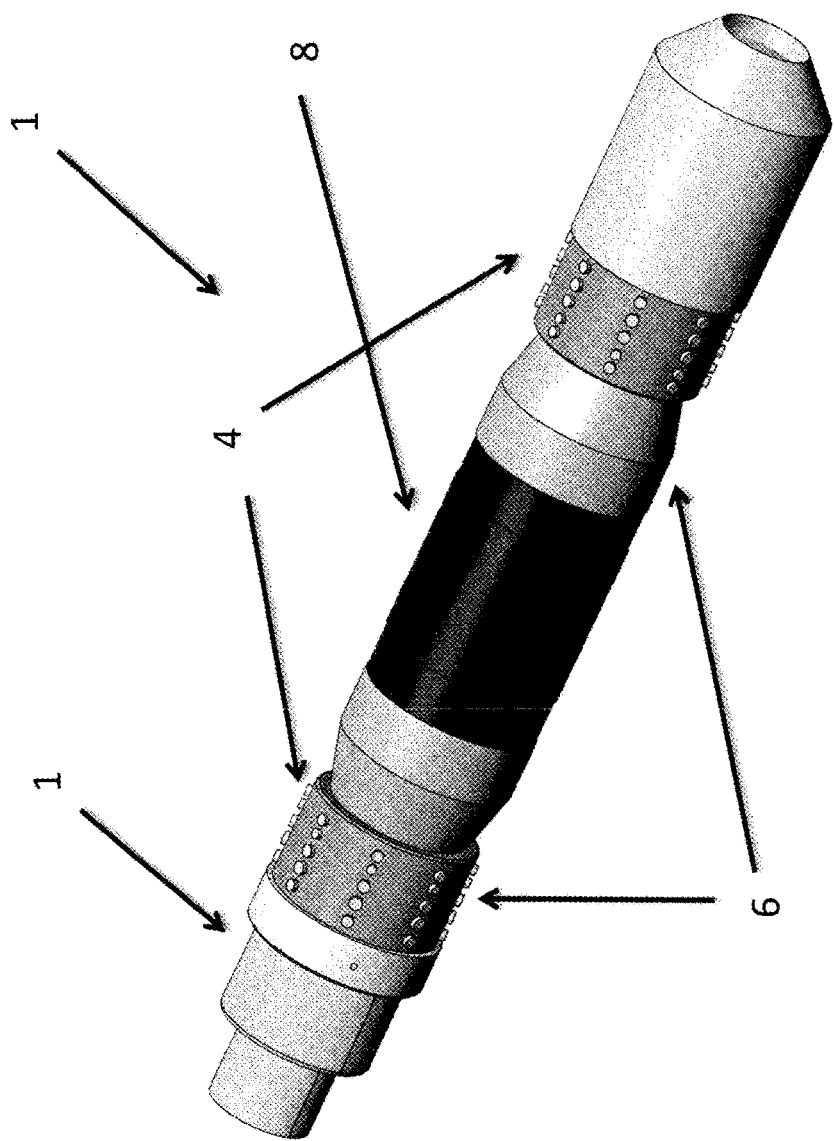
FIG. 1 illustrates a typical bridge or frac plug.

A multi-piece composite mandrel used in downhole bridge and frac plugs, and methods of manufacturing such a multi-piece composite mandrel, are disclosed. In certain embodiments, multiple composite material pieces are molded and then assembled into a generally cylindrical composite mandrel. In other embodiments, multiple composite material pieces are molded and then assembled into a non-cylindrical mandrel, for example polygonal, square, elliptical, and other shapes. The mandrel may have a longitudinal axis extending from a first end to a second end of the mandrel. A central bore may extend from a first end to a second end of the mandrel. The central bore may be generally circular, polygonal, square, elliptical, and other shapes. The central bore may be concentrically arranged within the mandrel along the longitudinal axis, or non-concentrically arranged with respect to the longitudinal axis.

As used herein, "composite materials" means materials made from two or more constituent materials with different physical or chemical properties, that when combined, produce a material with characteristics different from the individual components. For example, composite materials may include, but are not limited to, epoxy, phenolic, polyester, vinyl ester, polyimide, bismaleimide and other thermosetting and thermoplastic resins. The composite materials may also include reinforcing fibers including, but not limited to fiberglass, carbon fiber, polyester, basalt, aramid, and others. The reinforcing fibers may include random discontinuous chopped fibers, continuous fibers, and mixtures of random discontinuous chopped fibers with continuous fibers.

The composite mandrel includes multiple composite mandrel pieces configured such that when assembled about a common longitudinal axis they form the mandrel. It should be appreciated that any number of composite mandrel pieces may be assembled together about a common longitudinal axis to form the mandrel. In certain embodiments, the mandrel pieces may have cross-sectional areas that are less than the cross-sectional area of the finally assembled mandrel. The mandrel pieces may be symmetrical or asymmetrical, equally or unequally sized or spaced about the longitudinal axis in accordance with one or more embodiments.

The mandrel pieces may include corresponding joints surfaces configured to engage upon assembly. For example, the joint surfaces may be configured to restrict movement between the mandrel pieces in the longitudinal direction using any shape or configuration. The joint surfaces may be configured to extend along a full or partial length of the mandrel parallel relative to a longitudinal axis of the mandrel. Alternatively, the joint surfaces may be configured to extend along a full or partial length of the mandrel at an angle relative to a longitudinal axis of the mandrel. The mandrel may further include mechanisms to restrict movement between the mandrel pieces in a radial direction. Mandrel pieces may also be secured using any type of attachment mechanism including any type of adhesive material, mechanical fasteners such as threaded fasteners, pins, rivets, or any other means of mechanical fasteners, and any other type of attachment mechanisms. In certain embodiments, a combination of adhesive material and mechanical fasteners may be used.

Methods of manufacturing composite mandrels described herein may include, but is not limited to, compression molding, injection molding, transfer molding, resin transfer molding ("RTM"), resin infusion molding, pultrusion molding, and other molding processes.

Composite mandrels described herein may have any number of additional external or internal features integrally molded or machined during the molding process. Additional features may include attachment mechanisms such as threads or grooves used to attach components, or the additional features could include the components themselves molded integrally with the mandrel. The molding process allows additional features, like a head or shoe, to be molded net or near-net shape. For example, in one embodiment, a multi-piece mandrel may be molded with a head at one end or top of the mandrel. In another embodiment, a multi-piece mandrel may be molded with a shoe at one end or bottom of the mandrel. In yet other embodiments, a multi-piece mandrel may be molded having a shoe on one half and a head molded on the other half. Any number of additional external or internal feature configurations may be integrally molded or machined with the multi-piece mandrels.

Figure 2:
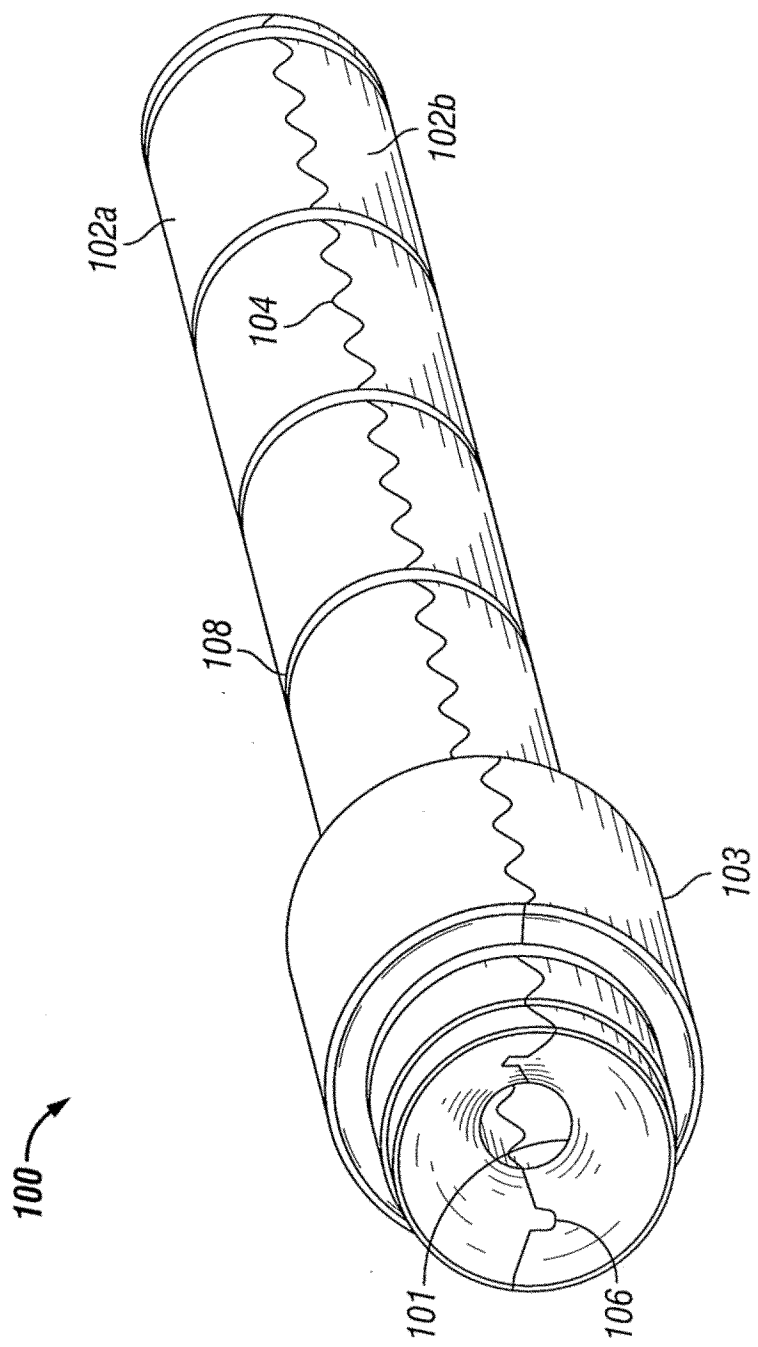
FIG. 2 illustrates a multi-piece mandrel in accordance with an embodiment.

FIG. 2 illustrates a multi-piece composite mandrel 100 in accordance with an embodiment. The mandrel may be generally cylindrical having a longitudinal axis extending from a first end to a second end of the mandrel. A generally cylindrical central bore 101 is concentrically arranged about the longitudinal axis of the mandrel and extends throughout a length of the mandrel. The mandrel may further include a head section 103 formed integrally on at least one end of the mandrel 100. The head section 103 may have an outer diameter greater than an outer diameter of the mandrel 100. The head section 103 may also be generally cylindrical or, alternatively, may be other shapes.

Figure 3A:
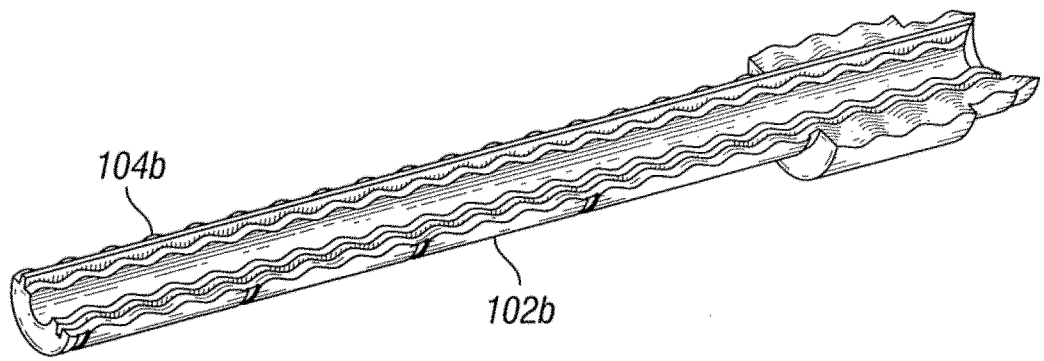
FIGS. 3A-B illustrate mandrel pieces molded in accordance with an embodiment.
Figure 3B:
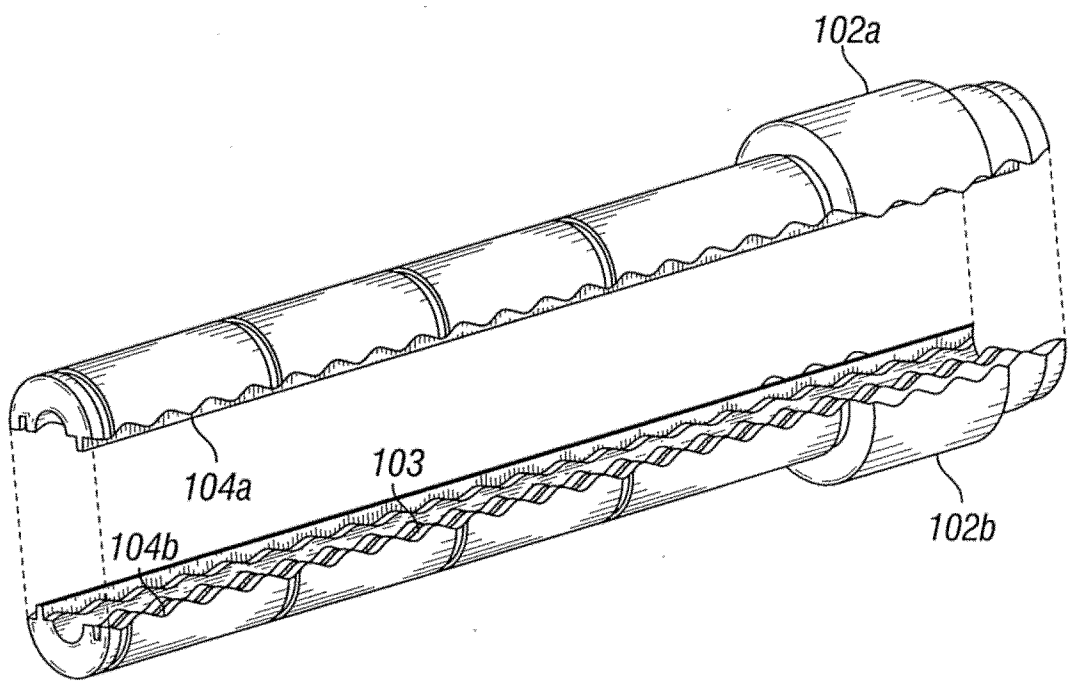
Figure 3C:
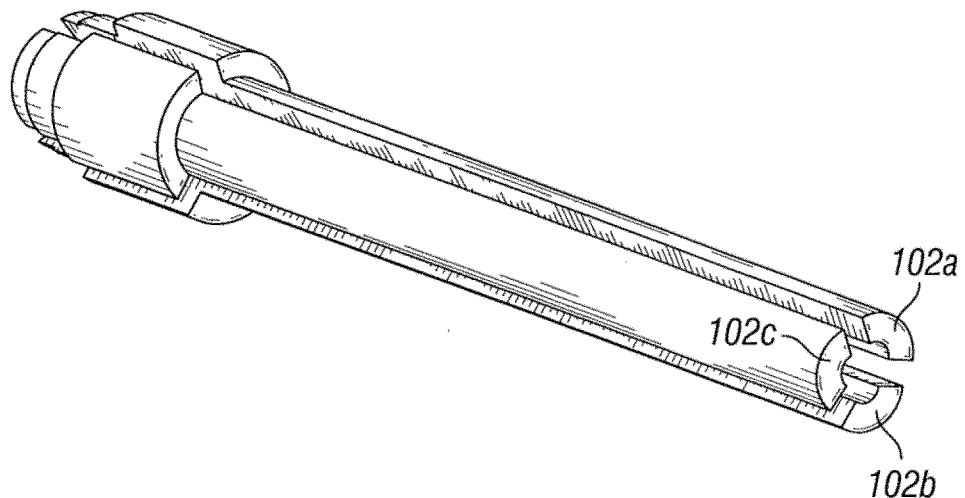
FIG. 3C illustrates mandrel pieces molded in accordance with an embodiment.
Figure 4:
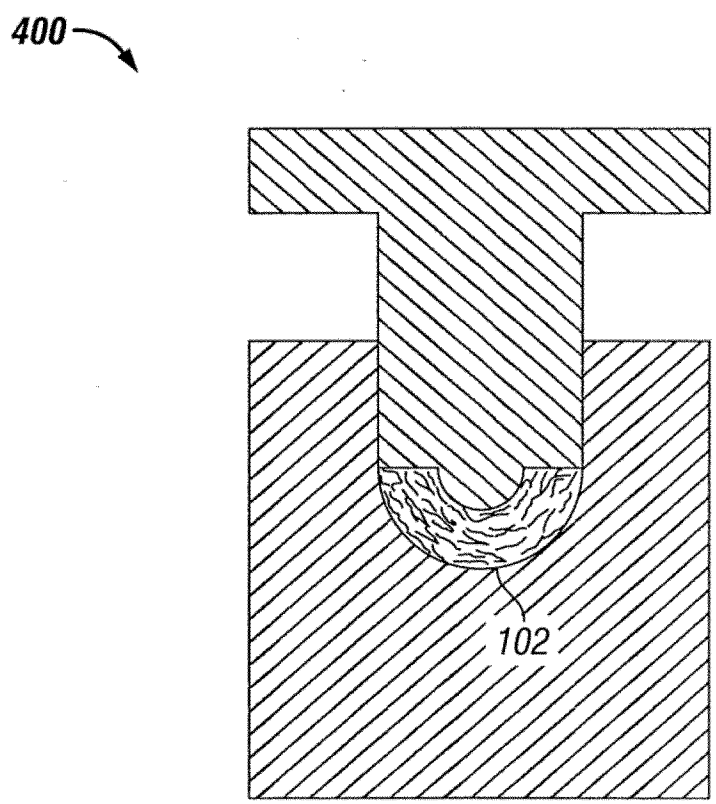

The mandrel 100 includes multiple mandrel pieces 102a, 102b, illustrated in FIGS. 3A and 3B. The mandrel pieces 102a, 102b may be compression molded, for example in a mold 400 shown in FIG. 4. Methods of manufacturing the mandrel pieces are described later. The mandrel pieces may be configured such that when assembled about a common longitudinal axis, they form a generally cylindrical mandrel. Assembled mandrel pieces also form a central bore extending through the mandrel and concentric about the longitudinal axis. For example, FIGS. 3A and 3B illustrate mandrel halves, which are assembled about a common longitudinal axis to form the generally cylindrical mandrel shown in FIG. 2. FIG. 3C illustrates mandrel thirds, which are assembled about a common longitudinal axis to form a generally cylindrical mandrel.

As further illustrated in FIGS. 2 and 3A-B, the mandrel pieces 102a, 102b may include corresponding joint surfaces 104a, 104b, respectively. The joint surfaces 104a, 104 are configured to engage upon assembly of the mandrel pieces 102a, 102b to form the mandrel 100. The joint surfaces 104a, 104b may be any type of joint design. For example, the joint surfaces 102a, 102b may include any type of corresponding undulating surfaces configured to engage and restrict movement between the mandrel pieces 102a, 102b in the longitudinal direction. In certain embodiments, the joint surfaces 102a, 102b may be beveled surfaces, or alternatively, flat surfaces resembling saw teeth. Any joint design restricting movement between the mandrel pieces in the longitudinal direction may be employed.

The mandrel pieces 102a, 102b may further include corresponding tongue and groove joints 105 (shown in FIGS. 5 and 5A) at one end of the mandrel 100, or at both ends of the mandrel 100. Each mandrel piece 102a, 102b may have a tongue portion 105a and a groove portion 105b that are configured to engage corresponding tongue and groove portions of adjacent mandrel pieces. The tongue and groove joint is configured to restrict movement between the mandrel pieces 102a, 102b in the radial direction. Any joint design restricting movement between the mandrel pieces in the radial direction may be employed.

Mandrel pieces 102a, 102b may be assembled and secured together using attachment mechanisms. The embodiment illustrated in FIGS. 3A and 3B may be bonded together using an attachment mechanism such as adhesive material, for example, but not limited to, epoxy, urethanes, phenolics, cyanoacrylic and acrylic polymers, methacrylates, and others. Adhesive material may be applied in any manner on the entire or only portions of joint surfaces 104a, 104b prior to assembling the mandrel pieces 102a, 102b. In certain embodiments, adhesive materials may be heat cured at elevated or ambient temperatures, light cured, or otherwise cured to speed or enhance the curing process. Alternatively, adhesive materials may be allowed to cure without heat.

Figure 5:
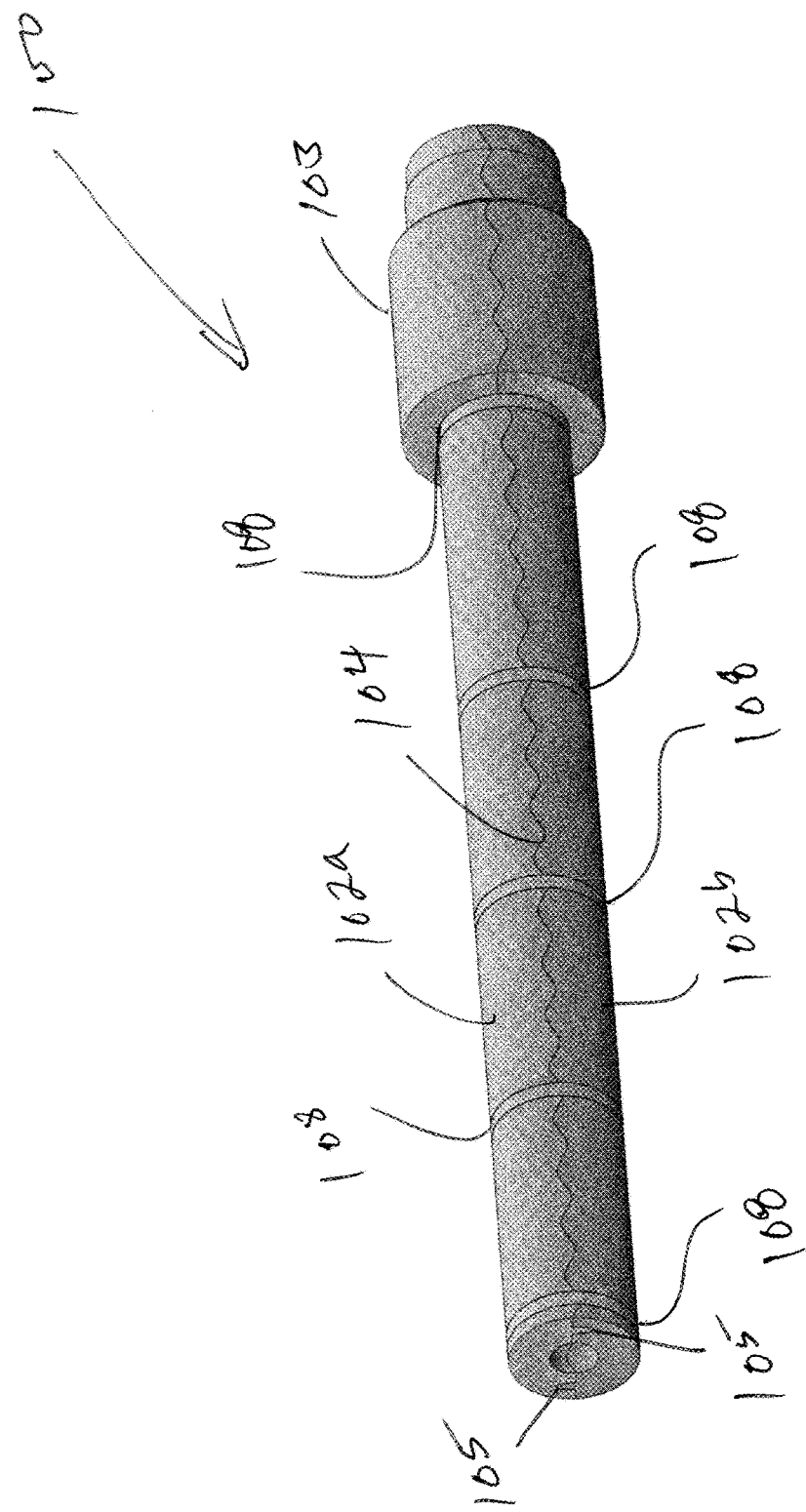
FIG. 5 illustrates an assembled multi-piece mandrel having continuous fiber bands wrapped around a diameter in accordance with an embodiment.
Figure 5A:
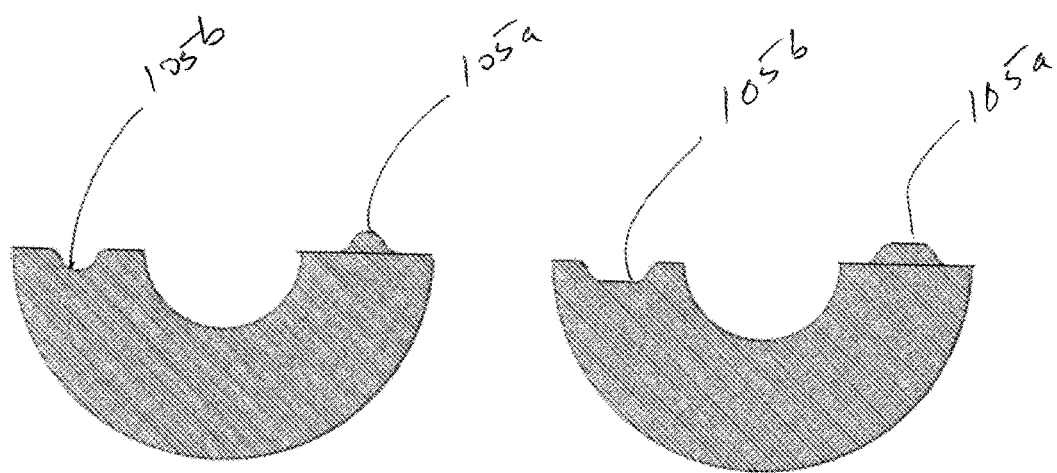
FIG. 5A illustrates a cross-sectional view of a tongue and groove joint in accordance with an embodiment.

Referring to FIG. 5, continuous fiber bands 108 may be wrapped around the mandrel 100 diameter to provide bonding or additional strength in one embodiment. The fiber bands 108 may be of any thickness or width. The fiber bands 108 may be spaced evenly or unevenly, and may be located anywhere along a length of the mandrel. The fiber bands 108 may be wrapped completely around the diameter of the mandrel 100, or in other embodiments, only partially. The fiber bands may be a polyester or epoxy filament winding in one embodiment. The fiber bands may be any continuous fiber with thermosetting or thermoplastic resins. For example, thermosetting resins may include, but are not limited to, polyesters, vinyl esters, polyurethanes, epoxies, phenolic, polyimide, cyanoacrylates, bismaleimide (BMI), benzoxazine, cyanate esters, and others. As another example, thermoplastic resins may include, but are not limited to polypropylene, polyamide (e.g., Nylon), polyetheretherketone (PEEK), polyphenylenesulfide (PPS), polyphthalamide (PPA), polyetherimide (PEI), and others.

Figure 4:
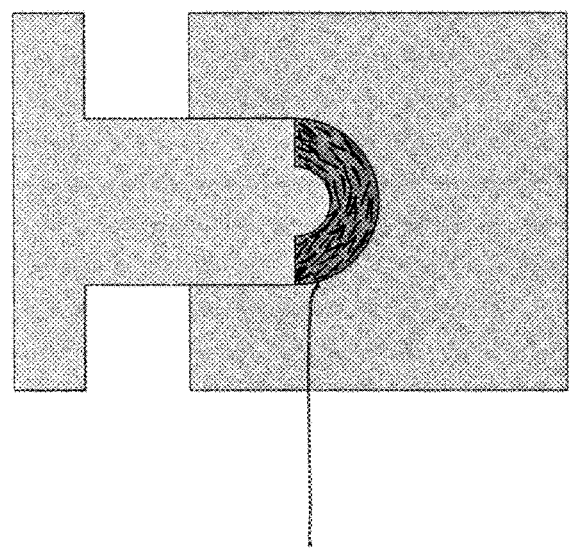
FIG. 4 illustrates a cross-section view of a mandrel piece in a compression molding device in accordance with an embodiment.

Methods of manufacturing multi-piece composite mandrels may include compression molding multiple mandrel pieces, such as shown in FIG. 4. Composite material is placed into a mold cavity and the mold is closed with a top force or plug member. The mold cavity is shaped to define the desired mandrel piece shape and configuration. In certain instances, the mold cavity and the mold material may be preheated. With compression molding thermoset materials, pressure is applied by the top force or plug member to force the composite material into contact with all surfaces of the mold cavity, while heat and pressure are maintained until the composite material has cured. When cured, the molded mandrel piece is removed from the mold cavity, and the process may be repeated to mold additional mandrel pieces.

The molded mandrel pieces are assembled about a common longitudinal axis to form a mandrel. One or more attachment mechanisms are used to secure the molded mandrel pieces together. For example, adhesive material may be applied to joint surfaces of the mandrel pieces, and the joint surfaces are engaged to form the mandrel. The adhesive material bonds the pieces together. In certain embodiments, the continuous fiber bands may be wrapped at least partially around the diameter of the assembled mandrel for bonding or added strength.

Figure 6C:
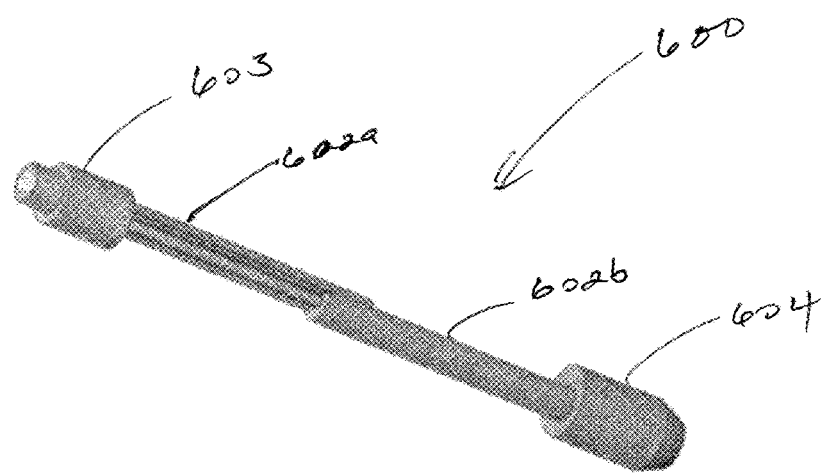
FIGS. 6A-D illustrate features molded into the multi-piece mandrel in accordance with an embodiment.
Figure 6D:
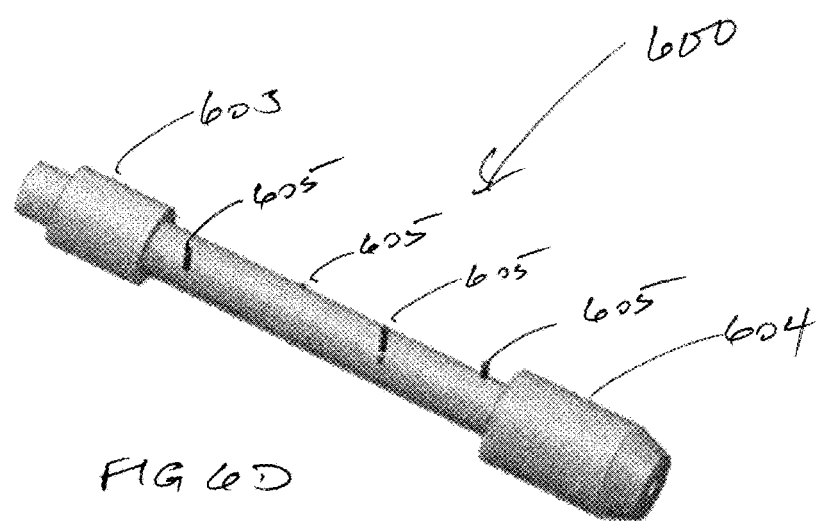
Figure 1:
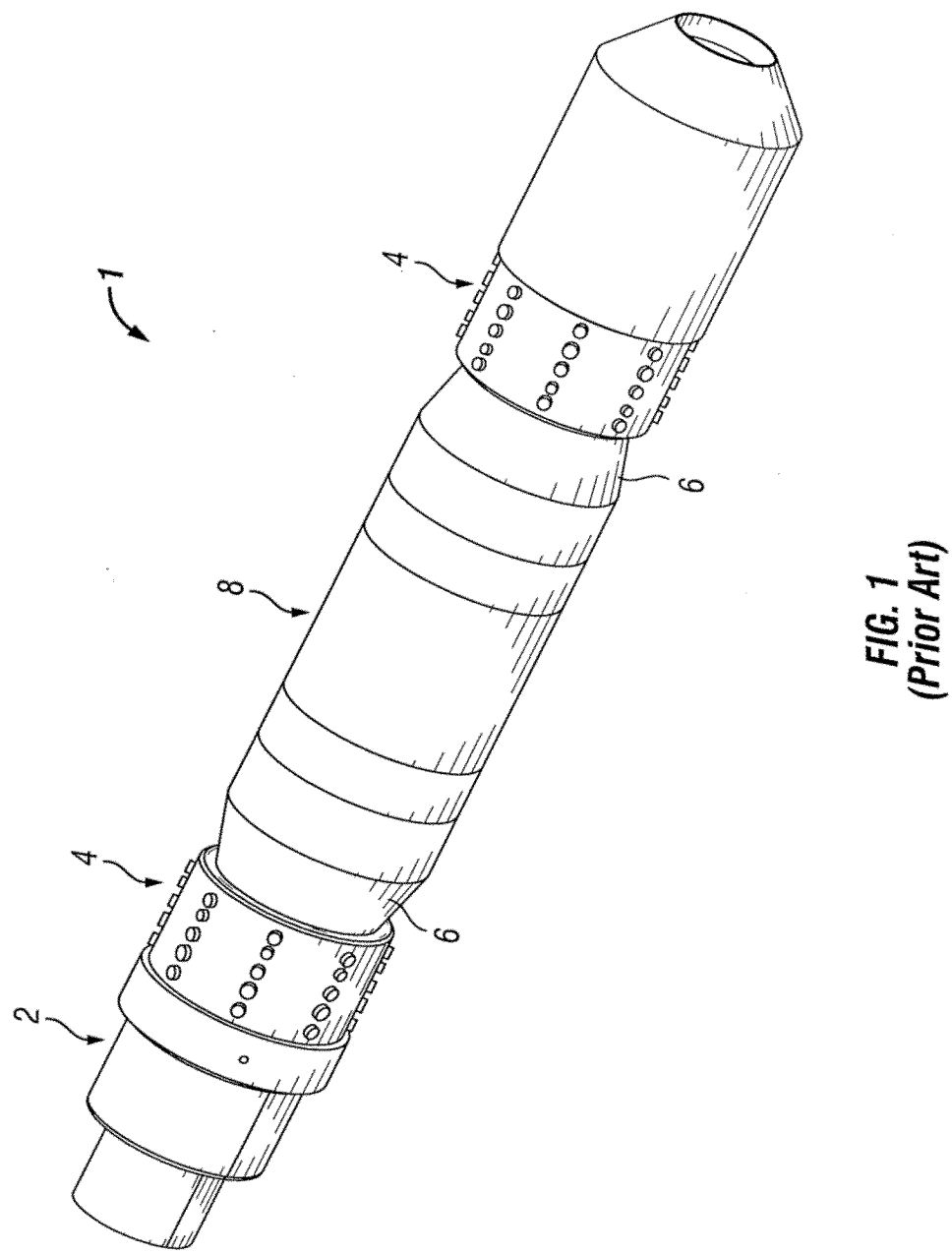
Figure 6A:
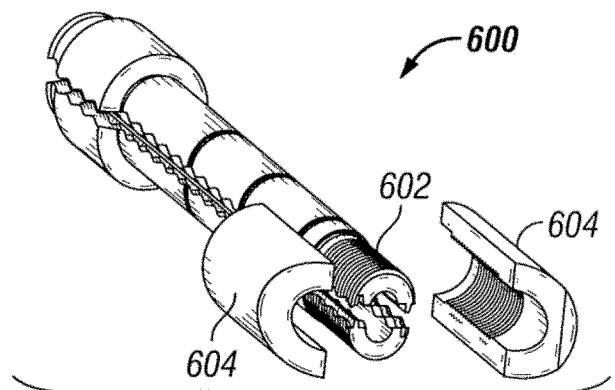
Figure 6B:
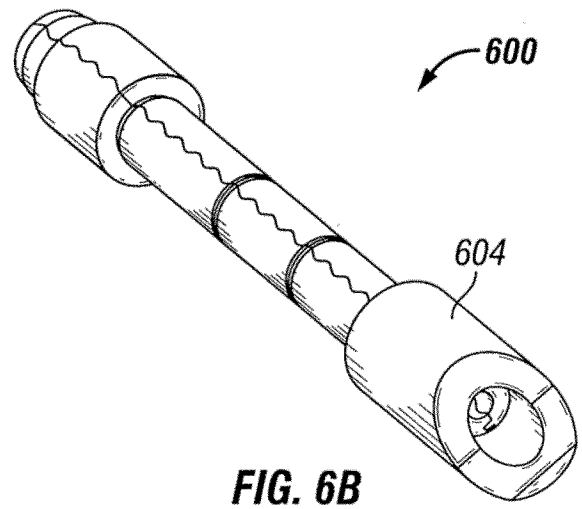
Figure 6C:
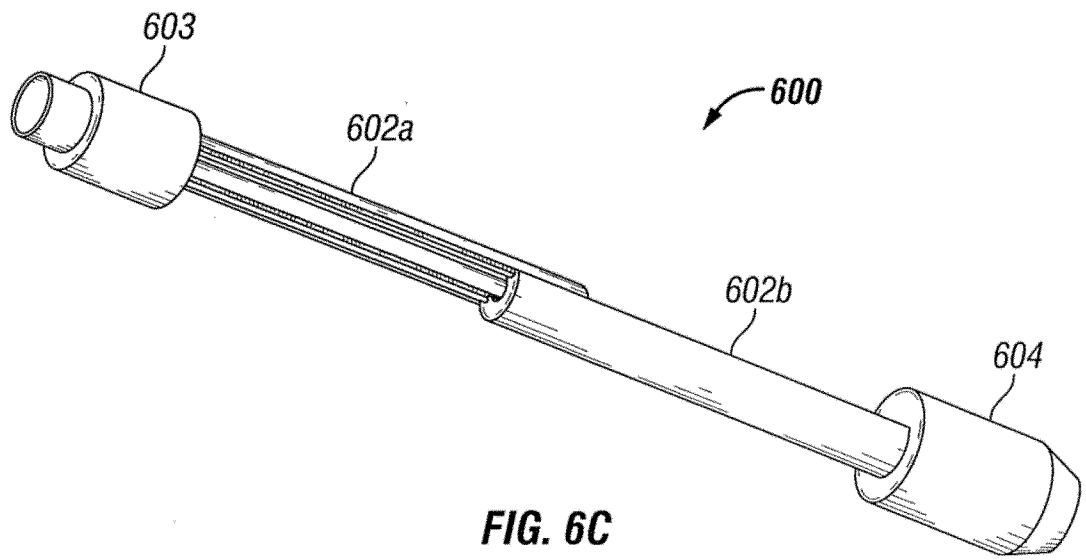
Figure 6D:
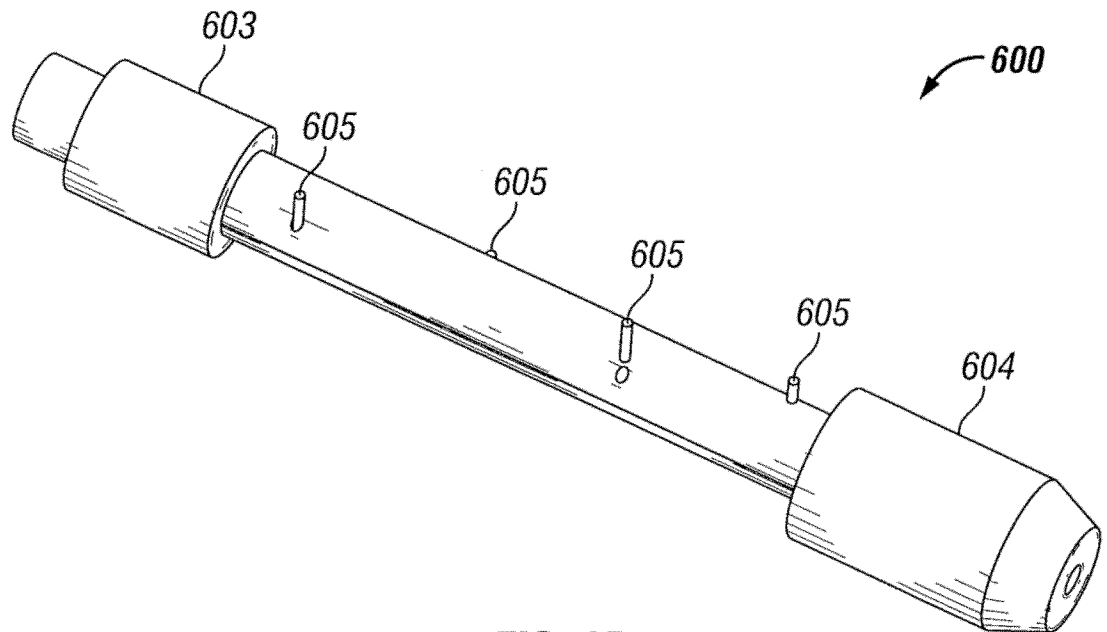
Figure 7:
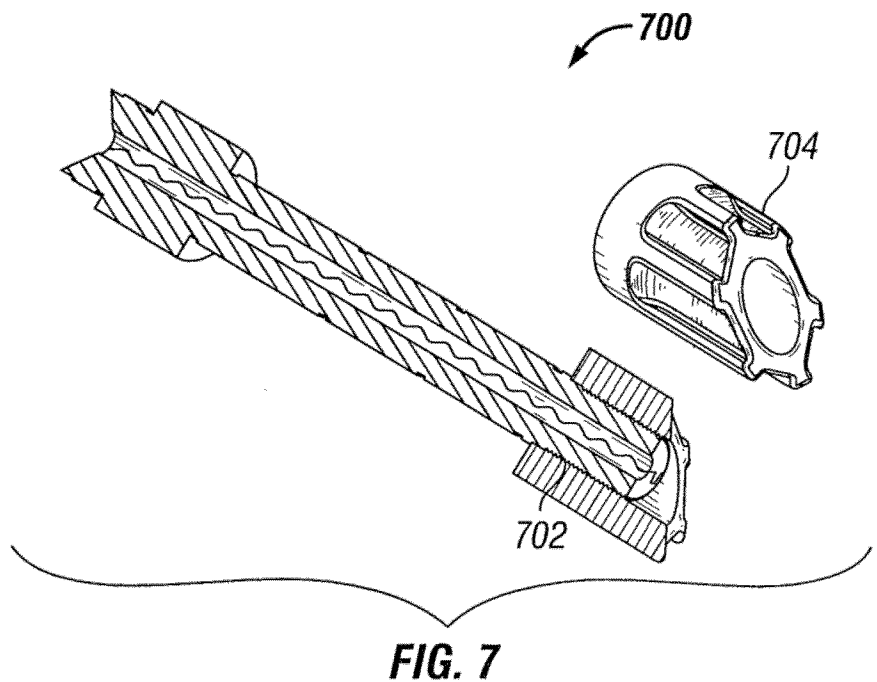
FIG. 7 illustrates a mule shoe threaded onto the mandrel in accordance with an embodiment.

FIGS. 6A-B illustrate examples of additional features that may be molded with or into a multi-piece composite mandrel 600 manufactured in accordance with embodiments disclosed herein. For example, the mandrel 600 may have grooves or teeth 602 molded into an end that engage corresponding grooves or teeth of a component installed on the end of the mandrel, such as a multi-piece mule shoe 604. FIGS. 6C-D illustrate a multi-piece mandrel 600 having a head section 603 molded on mandrel section 602a and a shoe 604 molded on another mandrel section 602b. The mandrel sections 602a, 602b may be slid together or joined, and one or more mechanical fasteners 605 may be used to secure the pieces together. FIG. 7 also illustrates an example of additional features that may be molded with or into a mandrel 700. For example, the mandrel 700 may have any type of threads 702 molded into an end that engage corresponding threads of a component installed on the end of the mandrel, such as a mule shoe 704. In other embodiments, mandrels manufactured and assembled in accordance with embodiments disclosed herein may be machined after assembly to add additional features or finished for precise tolerances.

Figure 8A:
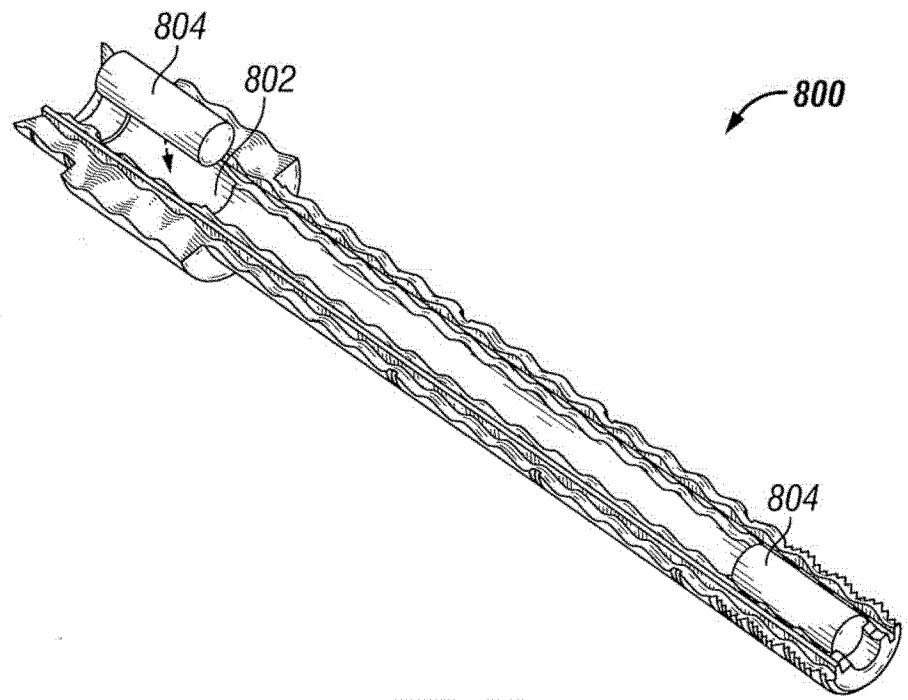
FIGS. 8A-B illustrate features molded inside the multi-piece mandrel in accordance with an embodiment.
Figure 8B:
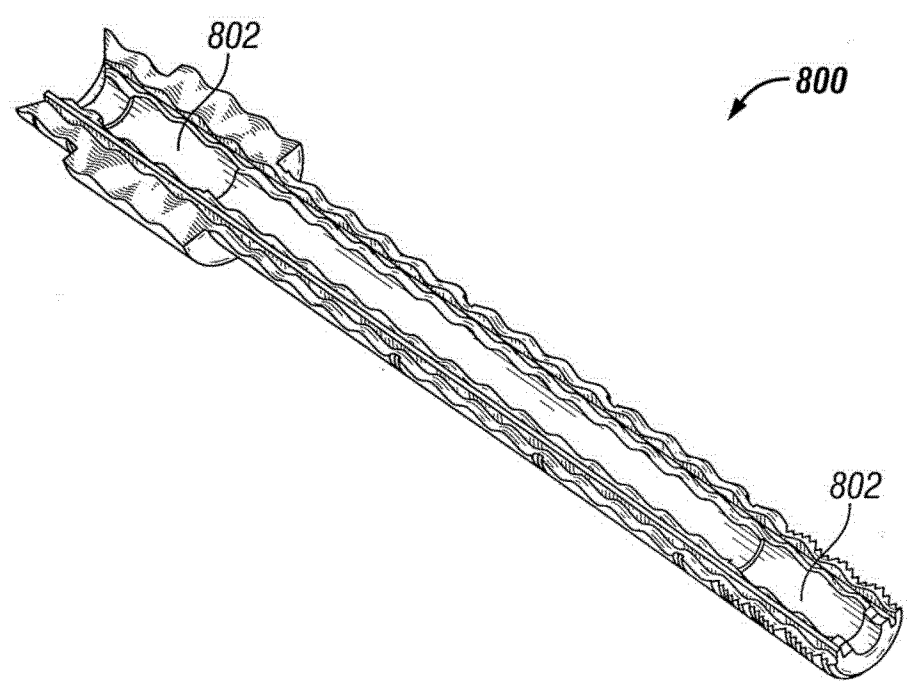

FIGS. 8A-B illustrate examples of internal features that may be molded with or into a mandrel 800. For example, the mandrel 800 may have one or more pockets 802 molded within the central bore (e.g., for bridge plugs). Plugs 804 may be inserted into the pockets 802 before the mandrel is assembled to provide positive location with fixation within the assembled mandrel.

Advantageously, molding mandrel pieces having cross-sectional areas less than the cross-sectional area of the finally assembled mandrel may provide better fiber orientation and allow local reinforcement of continuous fibers in the individual pieces. Molding smaller pieces also takes less time. Compression molding the mandrel pieces may take less than one hour in most instances, and even less than thirty minutes, fifteen minutes, or less than two minutes in others. Further, molding smaller pieces mostly eliminates shortcomings of compression molding a tube where undesired flow lines are created causing low strength areas.

The claimed subject matter is not to be limited in scope by the specific embodiments described herein. Indeed, various modifications of the invention in addition to those described herein will become apparent to those skilled in the art from the foregoing description. Such modifications are intended to fall within the scope of the appended claims.

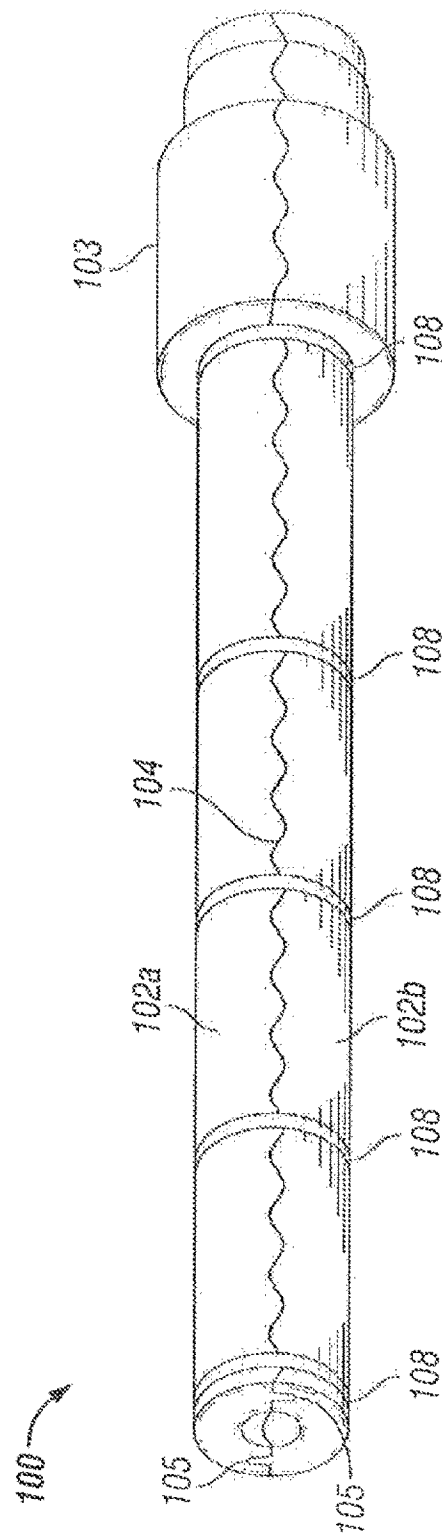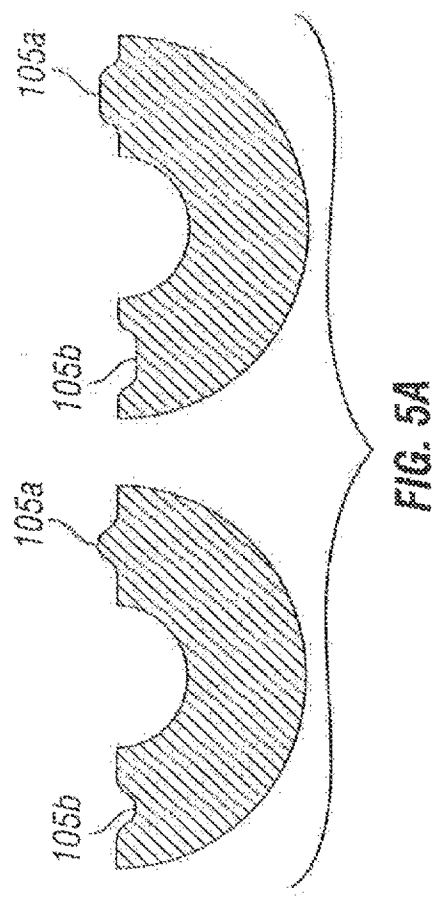

What is claimed is:

1. A mandrel for downhole isolation tools, the mandrel comprising:
   multiple composite pieces assembled about a common longitudinal axis at one or more common joint surfaces to form said mandrel;
   wherein each of said composite pieces is configured having a cross-sectional area less than the cross-sectional area of said mandrel; and
   an attachment mechanism configured to secure together said common joint surfaces.

2. The mandrel of claim 1, wherein said composite pieces comprise discontinuous random fibers.

3. The mandrel of claim 2, wherein said composite pieces comprise said discontinuous random fibers molded together with continuous reinforcing fibers.

4. The mandrel of claim 1, wherein said composite pieces are formed by a process selected from the group consisting of compression molding, injection molding, transfer molding, resin transfer molding, resin infusion molding, and pultrusion molding.

5. The mandrel of claim 1, further comprising joint surfaces configured to restrict movement between adjacent composite pieces in the longitudinal direction.

6. The mandrel of claim 5, wherein said joint surfaces comprise undulating surfaces.

7. The mandrel of claim 1, further comprising a tongue and groove joint for restricting movement between adjacent composite pieces in the radial direction.

8. The mandrel of claim 1, further comprising continuous fiber bands at least partially wrapped around a mandrel diameter.

9. The mandrel of claim 1, further comprising one or more external features integrally molded at one or more ends of said mandrel.

10. The mandrel of claim 1, further comprising one or more external features threadably engaged with threads integrally molded or machined at one or more ends of said mandrel.

11. The mandrel of claim 1, further comprising one or more internal features integrally molded within a bore of said mandrel.

12. A downhole tool for isolating a well casing zone in a wellbore, the tool comprising:
   a mandrel comprising:

multiple composite pieces assembled about a common longitudinal axis at one or more common joint surfaces to form said mandrel, wherein each of said composite pieces is configured having a cross-sectional area less than the cross-sectional area of said mandrel; and an attachment mechanism to secure together said joint surfaces;

a circular array of slips mounted on the mandrel at each end of the tool, wherein each slip has an outer surface configured to engage an internal surface of the well casing;

a conical ring mounted on the mandrel next to each array of said slips, wherein said conical ring is configured to slide under said slips and force the slips outward in the radial direction into engagement with the well casing; and an elastomeric seal between said conical rings configured to expand outward in the radial direction to seal the well casing.

13. The downhole tool of claim 12, the mandrel composite pieces further comprising discontinuous random fibers.

14. The downhole tool of claim 12, the mandrel composite pieces further comprising joint surfaces configured to restrict movement between adjacent composite pieces in the longitudinal direction.

15. The downhole tool of claim 14, wherein said joint surfaces comprise undulating surfaces.

16. The downhole tool of claim 12, the mandrel further comprising a tongue and groove joint for restricting movement between adjacent composite pieces in the radial direction.

17. The downhole tool of claim 12, the mandrel further comprising continuous fiber bands at least partially wrapped around a mandrel diameter.

* * * * *

UNITED STATES PATENT AND TRADEMARK OFFICE
CERTIFICATE OF CORRECTION

PATENT NO. : 9,631,452 B2
APPLICATION NO. : 14/247111
DATED : April 25, 2017
INVENTOR(S) : Michael Dale Kiesel et al.

It is certified that error appears in the above-identified patent and that said Letters Patent is hereby corrected as shown below:

On the Title Page

Delete "17 Claims, 9 Drawing Sheets" and insert --17 Claims, 8 Drawing Sheets--

In the Drawings

Sheet 1 of 9    Fig. 1    Delete low-quality printing of Sheets 1 of 9 thru Sheet 9 of 9 and insert replacement sheets 1/8 thru 8/8 (attached)

In the Specification

Column 4    Line 28    Delete "104a, 104" and insert --104a, 104b--
Column 4    Line 32    Delete "102a, 102b" and insert --104a, 104b--
Column 4    Line 36    Delete "102a, 102b" and insert --104a, 104b--

Signed and Sealed this
Twenty-sixth Day of May, 2020

Andrei Iancu
*Director of the United States Patent and Trademark Office*